United States Patent
Davies (10) Patent No.: US 9,443,249 B2
(45) Date of Patent: Sep. 13, 2016

(54) SOCIAL NETWORK-INFLUENCED INTEREST DETECTION

(71) Applicant: Google Inc., Mountain View, CA (US)

(72) Inventor: Winton Henry Davies, San Francisco, CA (US)

(73) Assignee: Google Inc., Mountain View, CA (US)

( * ) Notice: Subject to any disclaimer, the term of this patent is extended or adjusted under 35 U.S.C. 154(b) by 177 days.

(21) Appl. No.: 13/803,404

(22) Filed: Mar. 14, 2013

(65) Prior Publication Data

US 2014/0279782 A1  Sep. 18, 2014

(51) Int. Cl.
  *G06N 5/02* (2006.01)
  *G06Q 30/02* (2012.01)
  *G06Q 50/00* (2012.01)

(52) U.S. Cl.
  CPC ............ *G06Q 30/0201* (2013.01); *G06N 5/02* (2013.01); *G06N 5/022* (2013.01); *G06Q 50/01* (2013.01)

(58) Field of Classification Search
  None
  See application file for complete search history.

(56) References Cited

U.S. PATENT DOCUMENTS

| | | | | |
|---|---|---|---|---|
| 6,385,619 B1 * | 5/2002 | Eichstaedt et al. | ........... | 707/748 |
| 8,135,800 B1 * | 3/2012 | Walsh et al. | ................... | 709/217 |
| 8,745,028 B1 * | 6/2014 | Dijk | ................. | G06F 17/30675 707/708 |
| 2008/0052371 A1 | 2/2008 | Partovi et al. | | |
| 2011/0022602 A1 | 1/2011 | Luo et al. | | |
| 2011/0154223 A1 | 6/2011 | Whitnah et al. | | |
| 2012/0191531 A1 | 7/2012 | You et al. | | |
| 2012/0284249 A1 | 11/2012 | Ahmed et al. | | |
| 2012/0290405 A1 | 11/2012 | Talluri | | |
| 2012/0311030 A1 | 12/2012 | Lin et al. | | |
| 2013/0227011 A1 | 8/2013 | Sharma et al. | | |

OTHER PUBLICATIONS

Gibson et al., The Evercookie, Security Now! with Steve Gibson, Episode 270, 2006, pp. 1-23.*
International Search Report and Written Opinion in International Application No. PCT/US14/16894, mailed Oct. 8, 2014, 11 pages.
International Preliminary Report on Patentability in International Application No. PCT/US2014/016894, mailed Sep. 24, 2015, 10 pages.

* cited by examiner

*Primary Examiner* — Wilbert L Starks
(74) *Attorney, Agent, or Firm* — Fish & Richardson P.C.

(57) ABSTRACT

Methods, systems, and apparatus, including computer programs encoded on a computer storage medium, for selecting users that are connected to a particular user; accessing, for each of the selected users, an interest score of the selected user that reflects the selected user's predicted interest in the particular topic, or interest data that that is used to determine the interest score of the selected user; accessing a model that is used for generating the interest score of the particular user that reflects the particular user's predicted interest in the particular topic, wherein the interest score of the particular user is generated based at least on the interest scores or interest data of the selected users for the particular topic; and applying the interest scores or interest data of the selected users for the particular topic to the model to generate the interest score of the particular user for the particular topic.

17 Claims, 2 Drawing Sheets

SOCIAL NETWORK-INFLUENCED INTEREST DETECTION

TECHNICAL FIELD

The present specification relates to measuring a user's predicted interest in a particular topic.

BACKGROUND

A user can be assigned an interest score that reflects a likely level of interest of the user in a topic. The interest score can be used by computer-implemented services to tailor the services and content exposed by the services to the user, i.e., a personalized web experience.

SUMMARY

According to some innovative aspects of the subject matter described in this specification, an expert user can have specialized knowledge of a particular topic, and thus, may not need to interact with computer-implemented services that are associated with the particular topic. For example, an expert user may rarely conduct searches associated with the particular topic, and may never post questions about the topic in on-line forums. As a result, if an interest score for the particular topic is calculated based on the number of searches that the user performs or messages that a user posts, the interest score that is calculated for the expect user may not in fact reflect a strong interest in the particular topic.

Because the expert user may wish to be exposed to content related to the particular topic, the model that is used to calculate the interest score may be extended to consider additional signals in addition to or instead of traditional signals, to more accurately reflect the user's interest. For instance, the interest score can be calculated based on the interest scores, or other interest data, for the topic, or related topics, of friends that the user is connected to, e.g., through a social networking service. Thus, if the friends of the user have interest scores for the particular topic that reflect a heightened interest, the interest score of the user for the particular topic can be adjusted to reflect a similar, heightened interest.

Innovative aspects of the subject matter described in this specification may be embodied in methods that include the actions selecting one or more users that are connected to a particular user by way of a social networking service or by a relationship described by a graph stored in a database, wherein each user interacts with one or more services; accessing, for each of the selected users, an interest score of the selected user that reflects the selected user's predicted interest in the particular topic, or interest data that that is used to determine the interest score of the selected user; accessing a model that is used for generating the interest score of the particular user that reflects the particular user's predicted interest in the particular topic, wherein the interest score of the particular user is generated based at least on the interest scores or interest data of the selected users for the particular topic; and applying the interest scores or interest data of the selected users for the particular topic to the model to generate the interest score of the particular user for the particular topic.

Other embodiments of these aspects include corresponding systems, apparatus, and computer programs, configured to perform the actions of the methods, encoded on computer storage devices.

These and other embodiments may each optionally include one or more of the following features. For instance, selecting the model from among two or more models, each of the two or more models associated with a differing interest or class of interests. For one or more of the selected users, the interest data includes data associated with a number of interactions by the selected user that is associated with the particular topic over one or more channels. One or more factors associated with the number of interactions is weighted based on a type of the interaction. The interest score of the particular user is based on a summation of one or more of the weighted factors. The interactions include at least one of, or a combination of, downloads, views, comments, impressions, web searches, explicit confirmations, calendar-based interactions, chats, e-mails, web-based storage interactions, map-based searches, and video-based searches. For one or more of the selected users, the interest data further includes data associated with a number of channels that the interactions occurred over. The interest data includes data associated with a number of the selected users having interest in the particular topic.

The features further include, for example, the number of the selected users includes a number of selected users having an associated non-zero interest score for the particular topic. The number of the selected users includes a number of selected users having an associated interest score for the particular topic greater than a threshold. The number of the selected users includes a number of selected users having an associated non-zero interest score for an additional topic, the additional topic related to the particular topic. The additional topic is a sub-topic of the particular topic. The additional topic is an associated topic of the particular topic. For one or more of the selected users, the interest data is weighted based on a strength of a relationship between the particular user and the selected user.

The features further include, for example, receiving a search query associated with the particular topic from the particular user; receiving one or more search results based on the search query; and adjusting a score of at least one of the one or more search results based on the interest score of the particular user. Determining an order of the search results based on the score of each of the one or more search results, wherein the order includes a descending order. Receiving one or more posts, each of the posts including digital content; adjusting a score associated with at least one of the one or more posts based on the interest score of the particular user; and providing the one or more posts to the particular user based on the respective scores of the one or more posts. The one or more posts are displayed to the particular user in a stream page of the social networking service. Receiving one or more advertisements, each of the advertisements including digital content; adjusting a score associated with at least one of the one or more advertisements based on the interest score of the particular user; and providing the one or more advertisements to the particular user based on the respective scores of the one or more advertisements. The one or more advertisements are provided to the particular user on a search engine results page. Updating a profile of the particular user based on the interest score of the particular user for the particular topic. Comparing the interest score of the particular user to a threshold; and based on the comparison, determining that the interest score of the particular user is greater than the threshold, and in response, updating the profile of the particular user.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
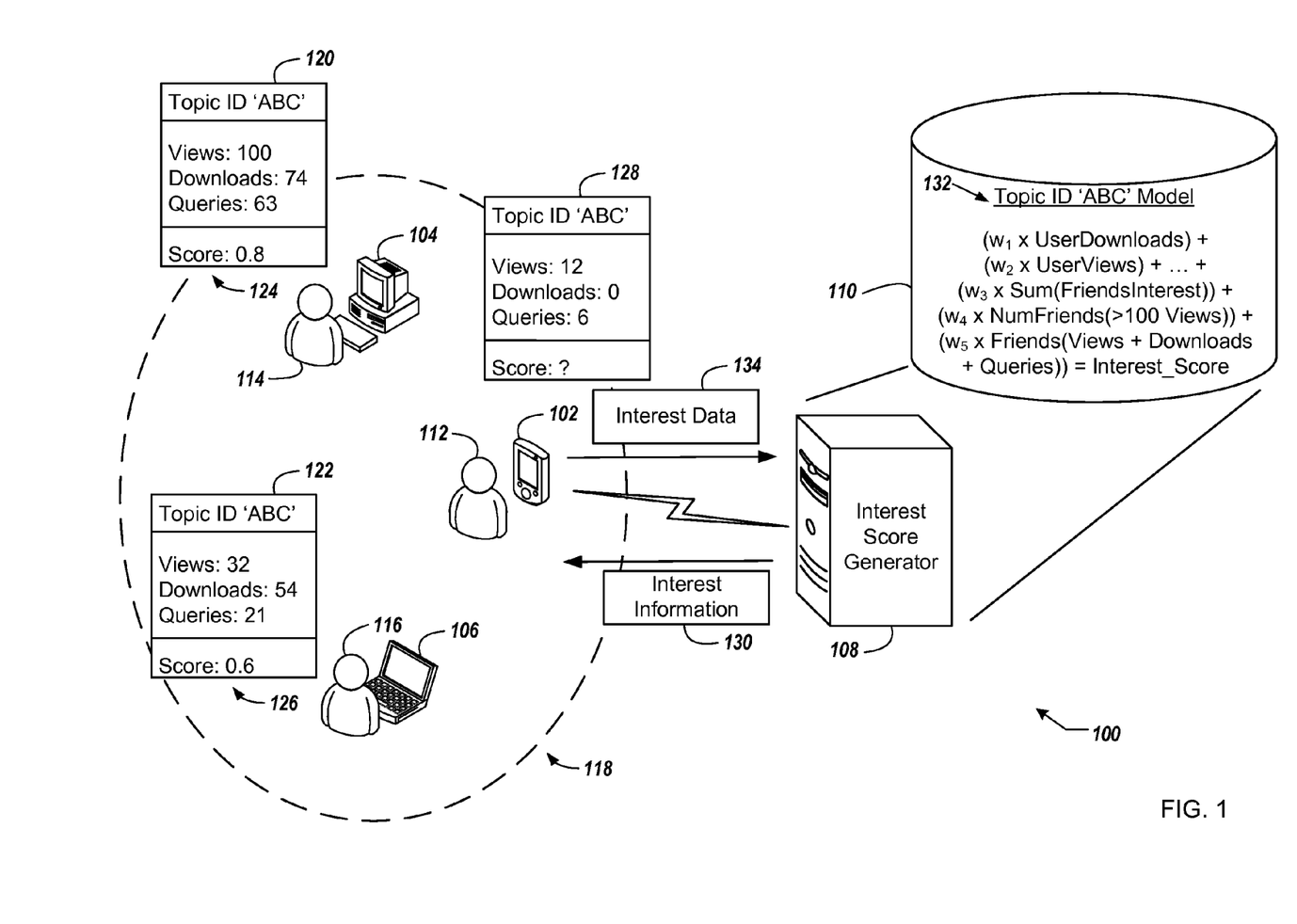
FIG. 1 depicts an example system for interest score generation.

FIG. 1 depicts a system 100 for generating an interest score that reflects a particular user's predicted interest in a particular topic. Briefly, the system 100 can generate the particular user's interest score for the particular topic based on, among other data, interest scores or interest data of other users that are connected to the particular user, e.g., through a social networking service or by relationships described by a graph stored in a database, with each user interacting with a service. An interest score for a user, e.g., the particular user or the others users, for the particular topic can be determined, generally, by applying various interest data, e.g., values, parameters, measures, etc., to a model to generate the respective interest score.

The system includes client devices 102, 104, 106, an interest score generator 108, and a data store 110. The client devices 102, 104, 106 and the interest score generator 108 are in communication over one or more networks, e.g., the Internet.

The users 112, 114, 116 of the client devices 102, 104, 106, respectively, interact with the client devices 102, 104, 106, respectively, including participating in one or more computer-implemented services provided by one or more service providers. Example computer-implemented services can include searching services, social networking services, micro-blogging services, blogging services, document sharing services, image sharing services, video sharing services, calendar services, chat services, e-mail services, storage, e.g., "cloud," services, mapping services, image searching services, and video searching services.

In some implementations, an interest score for the user 112 is determined for a particular topic 'ABC'. The interest score can be a predicted interest for the user 112 in the particular topic 'ABC,' or a related topic to the particular topic 'ABC.' The particular topic 'ABC' can be any content-based topic that is exposed by the computer-implemented services. For example, the topic can include an entity, such as a person, place, object, area of knowledge, subject, field of data, or other similar-content related data. For example, to name a few, the particular topic can be a musical artist, e.g., Lady Gaga; a place, e.g., Austin, Tex.; a field of study, e.g., Physics, or a computer programming language, e.g., the Python programming language.

In some examples, the interest score for the user 112 can be based on interest scores or interest data of a selected one or more users that are connected to the user 112 by way of a social networking service or by a relationship described by a graph stored in a database, wherein each user interacts with one or more services. Specifically, the user 112 can be associated with one or more computer-implemented services, e.g., social networking services. Within each computer-implemented service, the user 112 can have personal relationships, e.g., social connections, with one or more users, e.g., friends. For example, the user 112 can be connected to the users 114 and 116 through a social networking service. In some examples, the users 114 and 116 are within a "social circle" 118 of the user 112. In some examples, one of the users 114 and 116 is a direct contact, or friend, to the user 112. In some examples, one of the users 114 and 116 is an in-direct contact, or "friend-of-friend," of the user 112.

In some examples, the users 114 and 116 can be selected as a subset of other users that the user 112 is connected to through a social networking service. For example, the user 112 can be connected to multiple users, with the users 114 and 116 representing a subset of the multiple users. In some examples, the subset of the users that are identified, e.g., users 114 and 116, can be identified by filtering the multiple users that are connected to the user 112. For example, the multiple users that are connected to the user 112 can be filtered based on one or more criteria, e.g., work-related users, and thus identifying users 114 and 116 as being work-related users. In some examples, the users 114 and 116 are connected to the user 112 over differing computer-implemented services. For example, the user 114 is connected to the user 112 by way of a social networking service and the user 116 is connected to the user 112 by way of a micro-blogging service.

In some implementations, for each of the selected users, e.g., users 114 and 116, interest scores or interest data associated with the selected users is accessed. Specifically, the interest scores for the users 114 and 116 reflects an interest by the respective users in the particular topic 'ABC', and interest data for the users 114 and 116 is used to determine the respective user's interest score that reflects the respective user's predicted interest in the particular topic 'ABC.' For example, the particular topic 'ABC' might be the Python programming language, and the users 114 and 116 can work with the Python programming language, e.g., at a software development firm, and thus, have interest in the Python programming language.

In some implementations, the system may allow a user to prevent access to relationships between the users, e.g., the users 112, 114, 116, and access to interest scores or interest data associated with the users, e.g., the users 114, 116, for example, through user preference settings. In some implementations, privacy features may provide a user with an opt-in or opt-out option to allow or prevent, respectively, access to relationships between the users, and access to interest scores or interest data associated with the users.

The interest scores and the interest data for the users 114 and 116 can be stored in one or more data stores, e.g., network-accessible data stores. In some examples, the data stores can include a relational database, for example, that associates the users 114 and 116 with the interest scores and the interest data.

In some implementations, for one or more of the selected users, e.g., the users 114 and 116, the interest data includes data associated with a number of interactions by the selected user that is associated with the particular topic over one or more channels. For example, the users 114 and 116 are associated with interest data that reflects an interest in the particular topic 'ABC.' In some examples, the interest data associated with the users 114 and 116 is based on interactions, and the number of interactions, by the users 114 and 116 with computer-implemented services. For example, the interactions by the users 114 and 116 that are associated with the particular topic 'ABC' can include such interactions as downloads, views, comments, impressions, web searches, explicit confirmations, calendar-based events, chats, e-mails, web-based storage interactions, map-based searches, and video-based searches. In some examples, the interest data can be weighted based on the type of interaction. For example, web search interactions associated with the particular topic 'ABC' are weighted more, e.g., when determining an interest score for the particular topic 'ABC,' described below, as compared to map-based searches associated with the particular topic 'ABC'.

In some implementations, for one or more of the selected users, e.g., the users 114 and 116, the interest data further includes data associated with a number of channels over which the interactions occurred. For example, the channels can include the computer-implemented services used by the users 114 and 116 that the users 114 and 116 interact with. For example, the channels used by the users 114 and 116 that are associated with the particular topic 'ABC' can include such channels as e-mail-based services, chat-based services, video-based services, image-based services, search-based services, storage-based services, calendar-based services, and map-based services. In some examples, the interest data can be weighted based on the type of channel over which the interaction occurred. For example, interactions over e-mail-based channels associated with the particular topic 'ABC' are weighted more, e.g., when determining an interest score for the particular topic 'ABC,' as compared to calendar-based interactions associated with the particular topic 'ABC'.

In some implementations, for one or more of the selected users, e.g., the users 114 and 116, the interest data includes data associated with a number of interactions by the selected user that is associated with the particular topic and the number of channels the interactions occurred over.

In some examples, the users 114 and 116 are associated with interest data for the particular topic 'ABC,' graphically illustrated as interest data 120 and 122, respectively. Specifically, in some examples, the interest data 120 and 122 can include, among other items of data, a number of views associated with the particular topic 'ABC' over one or more channels; a number of downloads associated with the particular topic 'ABC' over one or more channels; and a number of queries associated with the particular topic 'ABC' over one or more channels. For example, views associated with the particular topic 'ABC' over one or more channels can include such interactions as views of a web-page or video associated with the particular topic 'ABC.' Continuing, for example, downloads associated with the particular topic 'ABC' over one or more channels can include such interactions as file downloads associated with the particular topic 'ABC.' Continuing, for example, queries associated with the particular topic 'ABC' over one or more channels can include such interactions as web-based queries or image-based queries associated with the particular topic 'ABC.'

In some examples, the data items of the interest data 120 and 122 differ for each user 114 and 116. For example, the interest data 120 can include an additional data item that is not included by the interest data 122. In some examples, the data items included by the interest data 120 and 122 is based on the users 114 and 116, respectively.

For example, the interest data 120 associated with the user 114 includes 100 views, 74 downloads, and 63 queries, e.g., over the channels, that is associated with particular topic 'ABC;' and the interest data 122 associated with the user 116 includes 32 views, 54 downloads, and 21 queries, e.g., over the channels, that is associated with the particular topic 'ABC.'

In some implementations, for one or more of the selected users, e.g., the users 114 and 116, the users can be associated with an interest score that is based on the respective interest data. Specifically, the user 114 can be associated with an interest score 124 for the particular topic 'ABC' that is based on the interest data 120; and the user 116 can be associated with an interest score 126 for the particular topic 'ABC' that is based on the interest data 122. The scores 124 and 126 can be generated using any type of model, including models that are based on the respective interest data 120 and 122. In some examples, the scores 124 and 126 are generated using differing models. In some examples, the scores 124 and 126 are generated using substantially the same models.

In some examples, the scores 124 and 126 are time-based. Specifically, the scores 124 and 126 can be based on interest data 120 and 122, respectively, that is generated over a certain time period, e.g., the last 6 months.

For example, based on the interest data 120 associated with the user 114, the interest score 124 for the particular topic 'ABC' is 0.8; and based on the interest data 122 associated with the user 116, the interest score 126 for the particular topic 'ABC' is 0.6. In some examples, the interests scores 124 and 126 are normalized to be values between [0,1].

In some implementations, the user 112 is associated with interest data 128, analogous to that of the interest data 120 and 122 associated with the users 114 and 116, respectively. For example, the interest data 128 associated with the user 112 includes 12 views, 0 downloads, and 6 queries, over the channels, that is associated with the particular topic 'ABC.' Additionally, the user 112 can be associated with an interest score 130 for the particular topic 'ABC' that is based on the interest data 128. However, with the minimal interaction numbers for the interest data 128, e.g., as compared to the interest data 120 and 122 of the users 114 and 116, respectively, the interest score 130 based on the interest data 128 may reflect a low interest for the user 112 in the particular topic 'ABC.' Thus, in some examples, the interest score 130 for the particular topic 'ABC' can further be based on the interest data 120, 122 or interest scores 124, 126 associated with the users 114 and 116, respectively, described further below In some implementations, a model 132 is accessed that is used for generating the interest score 130 that reflects a predicted interest for the user 112 in the particular topic 'ABC.' Specifically, the interest score 130 that is generated by the model 132 is based at least on one or more of the interest data 120, 122, 128 and the interest scores 124, 126.

In some examples, one or more of the interest data 120, 122, 128 and the interest scores 124, 126 is transmitted to the interest score generator 108, e.g., over a network. For example, any combination of the interest data 120, 122, 128 and the interest scores 124, 126 is transmitted to the interest score generator 108 and graphically illustrated as interest information 134.

In some examples, the interest information 134 is transmitted to the interest score generator 108 automatically, e.g., without a request from the interest score generator 108. For example, the interest information 134 can be transmitted to the interest score generator 108 automatically in response to an action, e.g., one of the users 112, 114, 116 interacted over a channel associated with the particular topic 'ABC.' In some examples, the interest information 134 is transmitted to the interest score generator 108 in response to a request, e.g., the interest score generator 108 generating a request for the interest information 134. In some examples, the interest information 134 is transmitted to the interest score generator 108 periodically, e.g., every hour, day, or week.

In some examples, the interest score generator 108 is coupled to, or has access to, the data store 110. The data store 110 can include one or more models, e.g., the model 132. In some examples, the model 132 is selected, e.g., by the interest score generator 108, from two or more models. Each of the two or more models is associated with a differing interest or class of interests. For example, the model 132 is associated with the particular topic 'ABC.' Thus, the model 132 is selected when determining the interest score 130 that is associated with the particular topic 'ABC' for the user 112.

The model 132 is used to generate the interest score 130 that reflects the particular user's predicted interest in the particular topic 'ABC.' In some examples, the model 132 includes an algorithm that is based on the interest data 120 and 122 associated with the users 114 and 116, respectively, or the interest scores 124 and 126 associated with the users 114 and 116, respectively. In some examples, the algorithm is further based on the interest data 128 associated with the user 112.

In some implementations, the interest information 134 is applied to the model 132 to generate the user's 112 interest score 130 for the particular topic 'ABC.' Specifically, the interest score generator 108 accesses the model 132 and applies the received interest information 134 to the model 132. In response to applying the interest information 134 to the model 132, the interest score generator 108 generates the interest score 130 for the user 112 for the particular topic 'ABC.'

In some examples, the interest score 130 is based on a summation of one or more factors of the interest information 134. For example, the model 132 includes a summation of two or more factors of the interest information 134, such as, a total number of views associated with the particular topic 'ABC' by the users 114 and 116 and a total number of queries associated with the particular topic 'ABC' by the users 114 and 116. In some examples, the interest score 130 is based on a weighted summation of two or more factors of the interest information 134. Specifically, two or more factors of the interest information 134 can be weighted based on a type of the interaction associated. For example, views associated with the particular topic 'ABC' by the users 114 and 116 are associated with a first weight and queries associated with the particular topic 'ABC' by the users 114 and 116 are associated with a second weight. Continuing, the model 132 can include a summation of factors of the interest information 134, such as, a weighted total number of views associated with the particular topic 'ABC' by the users 114 and 116 and a weighted total number of queries associated with the particular topic 'ABC' by the users 114 and 116.

In some examples, the interest information 134 includes data that is associated with a number of the selected users, e.g., users 114 and 116, having an interest in the particular topic 'ABC.' Specifically, the interest score 130 can be based on a number, e.g., quantity, of selected users, e.g., users 114 and 116, having interest data, e.g., interest data 120 and 122, associated with the particular topic 'ABC.' In some examples, the number of the selected users includes a number of selected users, e.g., user 114 and 116, having an associated non-zero interest score for the particular topic 'ABC.' For example, the interest scores 124 and 126 associated with the users 114 and 116, respectively, include non-zero values, e.g., values of 0.8 and 0.6, respectively. Thus, as the interest scores 124 and 126 are non-zero values, the interest score 130 associated with the user 112 can be based on a number of the users associated with the scores 124 and 126, e.g., two users. In some examples, the interest score 130 can be based on interest data associated with users having non-zero interest scores for the particular topic 'ABC'. For example, as the interest scores 124 and 126 are non-zero values, the interest score 130 can be based on the interest data 120 and 122 associated with the users 114 and 116.

In some examples, the number of the selected users, e.g., the users 114 and 116, includes a number of selected users having an associated interest score greater than a threshold. For example, the interest score 124 associated with the user 114 can be greater than a threshold, e.g., 0.7, while the interest score 126 associated with the user 116 can be less than the threshold. Thus, as the interest score 124 is greater than the threshold, the interest score 130 associated with the user 112 can be based on a number of users associated with the interest score 124, e.g., one user. In some examples, the interest score 130 can be based on interest data associated with users having an associated interest score greater than a threshold. For example, as the interest score 124 is greater than the threshold, the interest score 130 can be based on the interest data 120 associated with the user 114. The threshold can be based on one or more metrics, such as a type of interaction of the interest information 134.

In some examples, the interest information 134 includes data that is associated with a number of the selected users, e.g., users 114 and 116, having an interest in an associated particular topic 'DEF.' Specifically, the particular topic 'DEF' is related to the particular topic 'ABC.' In some examples, the particular topic 'DEF' is a sub-topic of the particular topic 'ABC.' For example, the particular topic 'DEF' is associated with Python compiler design, which is a sub-topic of Python programming language, the topic of the particular topic 'ABC.' In some examples, the particular topic 'DEF' is an associated topic of the particular topic 'ABC.' For example, the particular topic 'DEF' is associated with the C++ programming language, which is an associated topic of Python programming language, the topic of the particular topic 'ABC.'

To that end, the interest score 130 can be based on a number, e.g., quantity, of selected users, e.g., users having interest data associated with the particular topic 'DEF.' In some examples, the number of the selected users includes a number of selected users, e.g., user 114 and 116, having an associated non-zero interest score for the particular topic 'DEF.' In some examples, the interest score 130 can be based on interest data associated with users having non-zero interest scores for the particular topic 'DEF'.

In some examples, the interest information 134, for one or more of the selected users, e.g., the users 114 and 116, is weighted based on a strength of a relationship between the user 112 and the selected user. Specifically, as mentioned above, the user 112 can have personal relationships, e.g., social connections, with one or more users, e.g., users 114 and 116. In some examples, the users 112 and 114 can be in frequent contact with one another via the computer-implemented services. For example, the users 114 and 116 often share items with one another, e.g., through email and/or chat. In some examples, the user 112 and the user 116 can be in infrequent contact with one another via the computer-implemented services. For example, the user 112 might have received an email from the user 116 only once in the last several months. Thus, the strength of relationship between the user 112 and the user 114 is greater than the strength of relationship between the user 112 and the user 116. Thus, the interest data 120 associated with the user 114 can be weighted more as compared to the interest data 122 associated with the user 116 when generating the interest score 130 associated with the user 112.

The model 132 can be based on any combination and processing of the interest information 134 by the interest score generator 108 to generate the interest score 130 associated with the user 112 for the particular topic 'ABC.' For example, as depicted in FIG. 1, the model 132 is at least based on a weighted number of downloads associated with the particular topic 'ABC' of the interest data 128; a weighted number of views associated with the particular topic 'ABC' of the interest data 128; a weighted summation of interest scores 124 and 126 associated with the particular topic 'ABC;' a weighted number of selected friends, e.g., users 114 and 116, having greater than 100 views associated with the particular topic; and a weighted summation of the views, downloads, and queries associated with the particular topic 'ABC' across the selected friends, e.g., users 114 and 116. However, any algorithm can be used based on, e.g., a type of interactions of the interest data 120, 122, 128; end-use of the generated interest score 130, etc. In some examples, the output of the model 132 can be normalized to a value between [0,1].

The interest score generator 108 provides the interest score 130 to the client device 106 that is associated with the user 112, e.g., over a network. In some examples, the interest score generator 108 provides the interest score 130 to a computational engine that can process the interest score 130 that is used in such processing as query processing, social networking services, and advertisement systems. In some examples, the interest score generator 108 provides the interest score 130 to a data store for storing the interest score 130 and an association of the interest score 130 with the user 112, e.g., in an associated user profile.

In some implementations, a profile, or portrait, associated with the user 112 is updated based on the interest score 130 associated with the user 112 for the particular topic 'ABC.' For example, the profile can include one or metrics that are associated with the user 112. The metrics can be based on demographic information associated with the user 112, interaction data associated with the user 112, and other information associated with the user 112. The user profile can be stored in a network-accessible device, e.g., a data store storing a database. The user profile can be associated with the user 112, e.g., via a user name, e.g., a handle, associated with the user 112. In some examples, the user profile associated with the user 112 can be updated to include the interest score 130, e.g., when the user profile previously did not include the interest score 130, or updated to a new value associated with the interest score 130. In some examples, the user profile can include interest scores associated with any number of particular topics, or a subset of particular topics.

In some examples, the interest score 130 is compared to a threshold. Based on the comparison, it can be determined that the interest score 130 associated with the user 112 for the particular topic 'ABC' is greater than, or equal to, the threshold. When the interest score 130 is greater than the threshold, the profile of the user 112 can be updated. The threshold can be based on one or more metrics, such as the user 112, the particular topic 'ABC,' the model 132, etc. In some examples, when the interest score 130 associated with the user 112 for the particular topic 'ABC' is less than the threshold, the user profile associated with the user 112 is not updated. For example, the previous value associated with the particular topic 'ABC' as stored in the user profile associated with the user 112 is maintained, or the value is adjusted, e.g., decreased, to a different value, e.g., 0.

In some implementations, the interest score 130 associated with the user 112 can be used to adjust scores associated with search results, e.g., within a search engine results page, or SERP. Specifically, a search query can be received that is associated with the particular topic 'ABC' from the user 112. For example, the user 112 provides the query utilizing a search engine provided for display on the client device 102. A backend searching engine can receive the search query, e.g., over a network. The searching engine can be in communication with the client device 102 and the interest score generator 108. The search engine can generate search results based on the query. In some examples, the search results are user-independent search results, e.g., initial search results.

The search engine can further receive, or have access to, the user profile associated with the user 112, and specifically, the interest score 130 that is associated with the particular topic 'ABC' for the user 112. For example, the search engine can receive the user profile from a data store storing the user profile associated with the user 112. To that end, one or more of the results of the search results can be associated with a score, e.g., an initial score. For example, the score can be reflective of an indication of how likely the search result is to correspond to the search query. The search engine can adjust the initial score of at least one of the search results based on the interest score 130 for the particular topic 'ABC.' For example, the search engine can increase or decrease the initial score of one or more of the search results based on the interest score 130. That is, search results that are related to the particular topic 'ABC,' or closely related, are likely to receive an increase in score, while search results not related to the particular topic 'ABC,' or not closely related, are likely to receive a decrease in score, or no change in score. In some examples, an order of the search results is determined to include a descending order. That is, the search results are ordered based on the adjusted scores in view of the interest score 130 from highest to lowest.

In some implementations, the interest score 130 associated with the user 112 can be used in providing social networking posts to the user 112, e.g., as provided in a social stream page of a social networking service. Specifically, the user 112 can interact with a social networking service. The social networking service provides a stream of posts to the user 112, e.g., through the client device 102. The posts can be posts from friends, e.g., personal connections to the user 112 through the social networking service; sponsored posts, e.g., from a company utilizing the social networking service to promote a product; or posts from entities the user subscribes to. The posts can further include recommended posts based on the user's profile.

The posts can include digital content, e.g., text, video, audio, or web-based links, and can be associated with a time-stamp and/or a score, e.g., an initial score. In some examples, the posts can be provided to the user 112 in the social stream page based on the time-stamp, the score, or combination thereof. The score can be based on the content of the post. In some examples, the posts can be presented in the social stream page for the user 112 based on the time stamp such that the most recent posts are presented to the user first, e.g., at a top of the stream page. In some examples, the posts can be presented in the social stream page for the user 112 based on the associated score such that the highest scoring posts are presented to the user first, e.g., at a top of the stream page. Additionally, for example, the posts can be presented in the social stream page of the user 112 based on a combination, e.g., a weighted combination, of the associated score and the time-stamp of the post. For example, the posts can be presented based on time-stamp, with one or more posts that have an associated score above a threshold positioned in a more prominent position within the social stream page as compared to the normal positioning of the post with respect to the timestamp of the post.

To that end, the initial score associated with at least one of the posts can be adjusted based on the interest score 130 for the particular topic 'ABC,' e.g., by a social networking engine. For example, the initial score of one or more of the posts can be increased or decreased based on the interest score 130. That is, the posts related to the particular topic 'ABC,' or closely related, are likely to receive an increase in score, while posts not related to the particular topic 'ABC,' or not closely related, are likely to receive a decrease in score, or no change in score. The posts can be provided to the user 112 based on the adjusted scores of the posts in the social stream page of the social networking page.

In some implementations, the interest score 130 associated with the user 112 can be used in providing advertisements to the user 112, e.g., when the user 112 is experiencing a web page, such as search engine results page or a social networking service. Specifically, the advertisement includes digital content, such as text, video, audio, or other multimedia data. The advertisements can be associated with a score, e.g., an initial score. For example, based on the contents of the web page and the content of the advertisements, the score of the advertisement is an indication of how well the content of the advertisement relates to the content of the web page, e.g., how well a user experiencing the web page might be interested in the advertisement. For example, a sports-related web page may have sports-related advertisements as opposed to music-related advertisements.

To that end, the initial score associated with at least one of the advertisements can be adjusted based on the interest score 130 for the particular topic 'ABC,' e.g., by an advertisement-serving engine. For example, the initial score of one or more of the advertisement can be increased or decreased based on the interest score. That is, the advertisements related to the particular topic 'ABC,' or closely related, are likely to receive an increase in score, while advertisements not related to the particular topic 'ABC,' or not closely related, are likely to receive a decrease in score, or no change in score. The advertisements can be provided to the user 112 based on the adjusted scores of the advertisements on the web page. For example, the advertisements having adjusted scores can be provided to the user 112 on a search engine results page, e.g., in response a search query associated with the particular topic 'ABC.'

Figure 2:
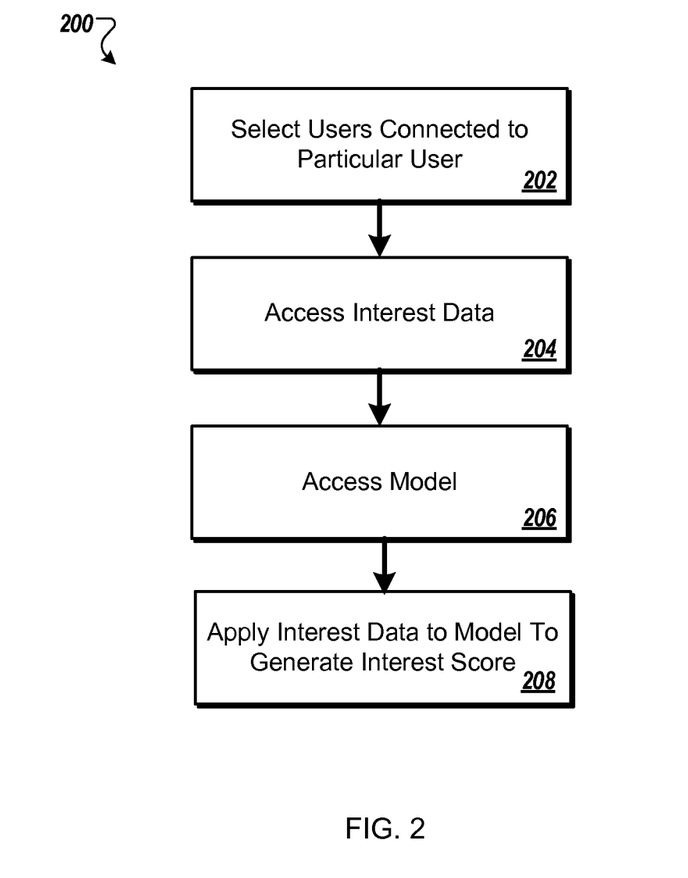
FIG. 2 depicts a flowchart of an example process for interest score generation.

FIG. 2 depicts a flowchart of an example process 200 for interest score generation. The example process 200 can be executed using one or more computing devices. For example, the system 100 can be used to execute the example process 200.

Selecting one or more users that are connected to a particular user by way of a social networking service, or by a relationship described by a graph stored in a database, wherein each user interacts with one or more services (202). For example, one or more users are selected that are connected to the user 112 by way of a social networking service. Specifically, the user 112 can be associated with one or more computer-implemented services, e.g., social networking services. Within each computer-implemented service, the user 112 can have personal relationships, e.g., social connections, with one or more users, e.g., friends. For example, the users 114 and 116 are selected that are connected to the user 112 by way of the social networking service.

For each of the selected users, accessing an interest score of the selected user that reflects the selected user's predicted interest in the particular topic, or interest data that is used to determine the interest score of the selected user (204). For example, for the users 114 and 116, the interest scores 124 and 126, or interest data 120 and 122, respectfully, is accessed. Specifically, the interest scores 124 and 126 for the users 114 and 116, respectfully, reflects an interest by the users in the particular topic 'ABC', and the interest data 120 and 122, is used to determine the user's 114 and 116, respectively, interest scores 124 and 126, respectively. The interest data 120, 122 and interest scores 124, 126 can be accessed over a network through one or more data stores.

Accessing a model that is used for generating the interest score of the particular user that reflects the particular user's predicted interest in the particular topic (206). Specifically, the interest score of the particular user is generated by the model is based at least on the interest scores or interest data of the selected users for the particular topic. For example, the model 132 is accessed that is used for generating the interest score 130 that reflects a predicted interest for the user 112 in the particular topic 'ABC.' The interest score 130 is generated by the model 132 that is based at least on the interest scores 124 and 126 of the users 114 and 116, respectively, or the interest data 120 and 122 of the users 114 and 116, respectively.

For each of the selected users, applying the interest scores or the interest data of the selected users for the particular topic to the model to generate the interest score of the particular user for the particular topic (208). For example, the interest information 134 is applied to the model 132 to generate the user's 112 interest score 130 for the particular topic 'ABC.' Specifically, the interest score generator 108 accesses the model 132 and applies the received interest information 134, e.g., over a network from client devices 102, to the model 132. In response to applying the interest information 134 to the model 132, the interest score generator 108 generates the interest score 130 for the user 112 for the particular topic 'ABC.'

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube)

or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method comprising:
    selecting one or more users that are connected to a particular user by way of a social networking service or by a relationship described by a graph stored in a database, wherein each user interacts with one or more services;
    obtaining, for each of the selected users, interest data indicating past interactions of the selected user that are associated with a particular topic and that are of different interaction types;
    selecting a model that is used for generating the interest score of the particular user that reflects the particular user's predicted interest in the particular topic from a set of two or more models each corresponding to a different topic, wherein the interest score of the particular user is generated based at least on the interaction types of the past interactions indicated by the interest data of the selected users as being associated with the particular topic;
    applying the interest data of the selected users for the particular topic to the model to generate the interest score of the particular user for the particular topic;
    receiving a search query associated with the particular topic from the particular user;
    determining, for each search result that is responsive to the search query, a search query score that reflects a likelihood that the search result corresponds to the search query;
    ranking the search results based on the interest score of the particular user for the particular topic and the search query scores; and
    providing a search results page based on the ranking of the search results.

2. The method of claim 1, wherein the model indicates different weights corresponding to different types of interactions.

3. The method of claim 2, wherein applying the interest data of the selected users for the particular topic to the model to generate the interest score of the particular user for the particular topic is based at least on a number of past interactions indicated by the interest data of each of the interaction types and the weights indicated by the model for each of the interaction types.

4. The method of claim 1, wherein the interaction types include two or more of downloads, views, comments, web searches, explicit confirmations, calendar-based interactions, chats, e-mails, web-based storage interactions, map-based searches, or video-based searches.

5. The method of claim 1, wherein the interest data indicates, for each of two or more different channels, two or more past interactions of the selected user made over the channel.

6. The method of claim 1, wherein two or more different channels include two or more of e-mail-based services, chat-based services, video-based services, image-based services, search-based services, storage-based services, calendar-based services, or map-based services.

7. The method of claim 1, further comprising:
    receiving one or more posts, each of the posts comprising digital content;
    adjusting a score associated with at least one of the one or more posts based on the interest score of the particular user; and providing the one or more posts to the particular user based on the respective scores of the one or more posts.

8. The method of claim 7, wherein the one or more posts are displayed to the particular user in a stream page of the social networking service.

9. A system comprising:
one or more computers; and
one or more storage devices storing instructions that are operable, when executed by the one or more computers, to cause the one or more computers to perform operations comprising:
selecting one or more users that are connected to a particular user by way of a social networking service or by a relationship described by a graph stored in a database, wherein each user interacts with one or more services;
obtaining, for each of the selected users, interest data indicating past interactions of the selected user that are associated with a particular topic and that are of different interaction types;
selecting a model that is used for generating the interest score of the particular user that reflects the particular user's predicted interest in the particular topic from a set of two or more models each corresponding to a different topic, wherein the interest score of the particular user is generated based at least on the interaction types of the past interactions indicated by the interest data of the selected users as being associated with the particular topic;
applying the interest data of the selected users for the particular topic to the model to generate the interest score of the particular user for the particular topic;
receiving a search query associated with the particular topic from the particular user;
determining, for each search result that is responsive to the search query, a search query score that reflects a likelihood that the search result corresponds to the search query;
ranking the search results based on the interest score of the particular user for the particular topic and the search query scores; and
providing a search results page based on the ranking of the search results.

10. The system of claim 9, wherein the model indicates different weights corresponding to different types of interactions.

11. The system of claim 10, wherein applying the interest data of the selected users for the particular topic to the model to generate the interest score of the particular user for the particular topic is based at least on a number of past interactions indicated by the interest data of each of the interaction types and the weights indicated by the model for each of the interaction types.

12. The system of claim 9, wherein the interaction types include two or more of downloads, views, comments, web searches, explicit confirmations, calendar-based interactions, chats, e-mails, web-based storage interactions, map-based searches, or video-based searches.

13. The system of claim 9, wherein the interest data indicates, for each of two or more different channels, two or more past interactions of the selected user made over the channel.

14. The system of claim 9, wherein two or more different channels include two or more of e-mail-based services, chat-based services, video-based services, image-based services, search-based services, storage-based services, calendar-based services, or map-based services.

15. The system of claim 9, further comprising:
receiving one or more posts, each of the posts comprising digital content;
adjusting a score associated with at least one of the one or more posts based on the interest score of the particular user; and
providing the one or more posts to the particular user based on the respective scores of the one or more posts.

16. The system of claim 15, wherein the one or more posts are displayed to the particular user in a stream page of the social networking service.

17. A non-transitory computer-readable medium storing software comprising instructions executable by one or more computers which, upon such execution, cause the one or more computers to perform operations comprising:
selecting one or more users that are connected to a particular user by way of a social networking service or by a relationship described by a graph stored in a database, wherein each user interacts with one or more services;
obtaining, for each of the selected users, interest data indicating past interactions of the selected user that are associated with a particular topic and that are of different interaction types;
selecting a model that is used for generating the interest score of the particular user that reflects the particular user's predicted interest in the particular topic from a set of two or more models each corresponding to a different topic, wherein the interest score of the particular user is generated based at least on the interaction types of the past interactions indicated by the interest data of the selected users as being associated with the particular topic;
applying the interest data of the selected users for the particular topic to the model to generate the interest score of the particular user for the particular topic;
receiving a search query associated with the particular topic from the particular user;
determining, for each search result that is responsive to the search query, a search query score that reflects a likelihood that the search result corresponds to the search query;
ranking the search results based on the interest score of the particular user for the particular topic and the search query scores; and
providing a search results page based on the ranking of the search results.

* * * * *

UNITED STATES PATENT AND TRADEMARK OFFICE
CERTIFICATE OF CORRECTION

PATENT NO. : 9,443,249 B2  Page 1 of 1
APPLICATION NO. : 13/803404
DATED : September 13, 2016
INVENTOR(S) : Winton Henry Davies It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 306 days.

Signed and Sealed this
Twenty-fifth Day of September, 2018

Andrei Iancu
*Director of the United States Patent and Trademark Office*